United States Patent [19]

Brin

[11] Patent Number: 5,042,869
[45] Date of Patent: Aug. 27, 1991

[54] LOCKING ARRANGEMENT FOR A MOTOR VEHICLE TOP

[75] Inventor: Constantin Brin, Stuttgart, Fed. Rep. of Germany

[73] Assignee: Dr. Ing. h.c.F. Porsche AG, Fed. Rep. of Germany

[21] Appl. No.: 619,933

[22] Filed: Nov. 27, 1990

[30] Foreign Application Priority Data

Dec. 11, 1989 [DE] Fed. Rep. of Germany ....... 3940839

[51] Int. Cl.$^5$ ............................................. B60J 7/185
[52] U.S. Cl. ...................................... 296/121; 292/36; 292/DIG. 5
[58] Field of Search ..................... 296/121, 120.1, 224; 292/DIG. 5, 36

[56] References Cited

U.S. PATENT DOCUMENTS

| | | | |
|---|---|---|---|
| 1,174,366 | 3/1916 | Van Den Plas | 292/36 |
| 2,486,905 | 11/1949 | Ackermans | 292/DIG. 5 X |
| 2,560,459 | 7/1951 | Lundberg et al. | 296/120.1 X |
| 2,570,261 | 10/1951 | Milhan | 292/DIG. 5 X |
| 2,586,648 | 2/1952 | Hale et al. | 296/120.1 |
| 2,831,718 | 4/1958 | Hallek et al. | |
| 2,852,292 | 9/1958 | Galla | 296/120.1 X |
| 3,089,719 | 5/1963 | Csizmansky | 296/120.1 X |
| 3,353,864 | 11/1967 | Antaya et al. | 296/121 |
| 4,664,436 | 5/1987 | Eyb | 296/121 |
| 4,830,425 | 5/1989 | Muscat | 296/120.1 X |
| 4,830,426 | 5/1989 | Schlachter et al. | 292/DIG. 5 X |

Primary Examiner—Margaret A. Focarino
Assistant Examiner—Gary C. Hoge
Attorney, Agent, or Firm—Evenson, Wands, Edwards, Lenahan & McKeown

[57] ABSTRACT

A locking arrangement for coupling a top with the windshield frame of a motor vehicle includes an actuating device arranged on a front frame part of the top approximately in the area of a longitudinal center plane of the vehicle. The actuating device, by way of transversely extending connecting elements, is connected to laterally exterior locking elements. The locking elements, when the top is in a closed position, interact with receiving devices mounted at the windshield frame. The receiving devices are only accessible from above in order to create a locking arrangement which, while having a simple mounting, ensures a good operation and enables large travel movements to be achieved in the vertical direction. The receiving devices are each formed by a closing part fastened to the windshield on which an approximately horizontally extending bolt is locally mounted. The bolt extends approximately in the longitudinal direction of the vehicle and, during the opening and the closing of the folding top, is in an operative connection with a locking hook of the locking element which is guided to be displaceable in the transverse direction of the vehicle.

15 Claims, 8 Drawing Sheets

LOCKING ARRANGEMENT FOR A MOTOR VEHICLE TOP

BACKGROUND AND SUMMARY OF THE INVENTION

This invention relates to a locking arrangement for a top coupling with the windshield frame of a motor vehicle and, more particularly, to a folding top having a central device arranged on a front frame part in the area of a longitudinal center plane of the vehicle. The actuating device is connected to laterally exterior locking elements via transversely extending connecting elements. When the folding top is closed, the actuating device interacts with receiving devices mounted on the windshield frame.

A locking arrangement for a top is known from U.S. Pat. No. 2,831,718. In this known arrangement, a front frame part of the vehicle top, having only an inserted sealing body, rests directly on the horizontally extending top side of the windshield frame and covers it completely. The locking arrangement for the folding top includes several upwardly projecting holders mounted to the windshield frame. Each holder has a lateral recess for a locking element. Each locking element is formed by a component which is rotated around a vertical axis. The upper edge of a curved upright cam interacts with an adjacent boundary surfaces of the recess during the closing operation of the top. The locking element, by means of rods, is connected with a central actuating device.

This known locking arrangement has the disadvantage that the mounting of the locking arrangement is expensive due to the individual parts which must be fastened in the correct position at the windshield frame and at the forward roof frame and which must be connected with one another in order to ensure a perfect functioning top. In addition, with this known locking arrangement, only slight vertical lifting movements can be implemented, i.e., the folding top must be manually pulled relatively far and with considerable force in the upward direction until the cam engages the recess of the holder. The actuating handle which projects into the passenger compartment and the holders at the windshield frame which project upward when the folding top is open represent a considerable risk of injury to the vehicle user.

There is therefore needed a locking arrangement for a vehicle top located between the windshield frame and a front frame part of the top which, while maintaining a simple mounting, functions well and achieves large travel movements in the vertical direction. In addition, a locking arrangement is needed which avoids injury to the vehicle user by the components of the locking arrangement.

According to the invention, these needs are met by a locking arrangement including a central actuating device operatively arranged on the front frame part of the top in the approximate area of a longitudinal center plane of the motor vehicle. Receiving devices are mounted on the windshield frame and laterally exterior locking elements interact with the receiving devices when the top is in a closed position. The central actuating device is operatively connected to the laterally exterior locking elements via transversely extending connecting elements wherein the receiving devices are only accessible from above. The receiving devices include a closing part fastened to the windshield frame and a bolt aligned approximately horizontally and extending in an approximate longitudinal direction of the motor vehicle. The bolt is mounted locally on the closing part wherein the laterally exterior locking elements include a locking hook which projects into the closing part and is displaceably guided in a transverse direction of the motor vehicle. The bolt is in an operative connection with the locking hook when the top is opened and/or closed.

The advantages of the present invention are that the locking arrangement, including a closing part formed with a longitudinally directed bolt and a locking hook which interacts with a carriage and can be moved in the transverse direction, is simple in construction and functions well. A relatively large amount of travel in the vertical direction is achieved by means of the design of the locking hook.

In addition, because the receiving device and the top-side components of the locking arrangement are almost completely covered, the risk of injury to the vehicle occupants when the top is open is significantly reduced. By combining the laterally exterior locking elements and the central actuating device on a common carrier plate, the locking arrangement mounting on the front frame part of the top is significantly simplified. As a result of the double tube guiding for the carriage, a stable locking arrangement is provided which can absorb relatively large forces.

Other objects, advantages and novel features of the present invention will become apparent from the following detailed description of the invention when considered in conjunction with the accompanying drawings.

DETAILED DESCRIPTION OF THE DRAWINGS

Figure 1:
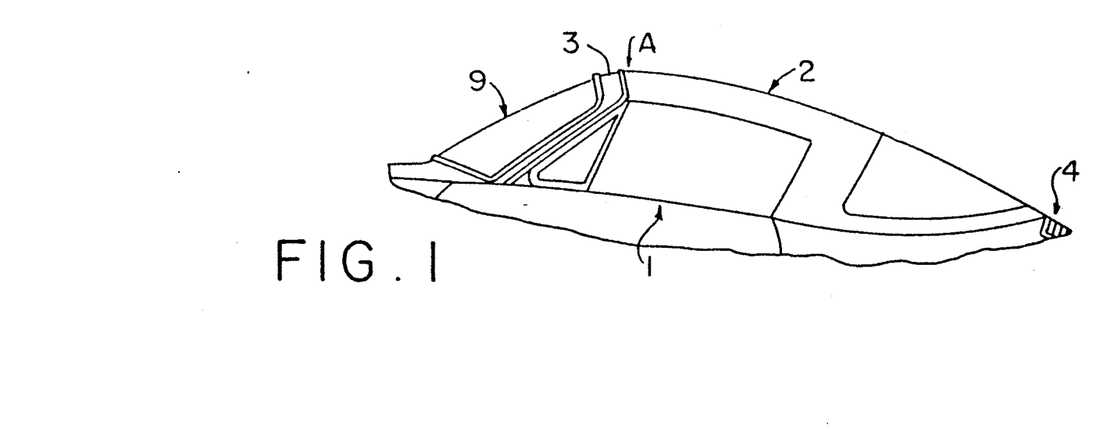
FIG. 1 is a partial lateral view of a passenger car having a folding top.

The partial area of a passenger car illustrated in FIG. 1 has a folding top 2 located above a belt line 1. In its closed position A, the folding top extends between a windshield frame 3 and a rear area 4 of the passenger car and is releasably held in position at the windshield frame 3. The windshield frame 3 comprises two profiled parts 5 and 6 which are connected with one another by means of flanges 7 and 8 welded together in the same direction (FIG. 3).

Figures 6, 7:
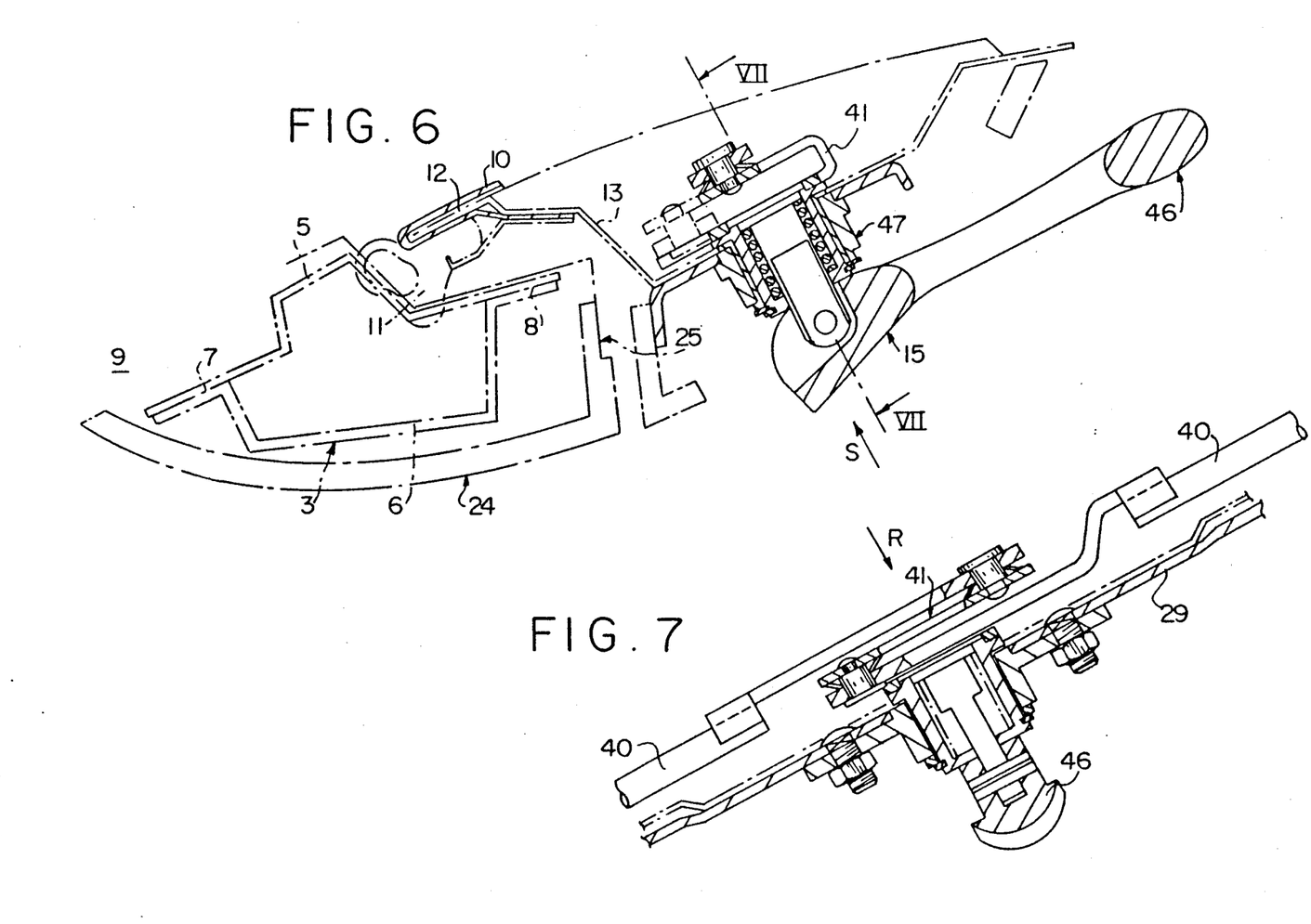
FIG. 6 is a sectional view according to Line VI—VI of FIG. 2.
FIG. 7 is a sectional view according to Line VII—VII of FIG. 6.

As shown in FIG. 6, an edge area of a front frame part 10 of the folding top 2 rests on the flange 8 of the windshield frame 3 facing away from a windshield 9 by way of a sealing body 11. The transversely extending front frame part 10 comprises sheet steel stampings 12, 13 which are connected with one another by means of welding, gluing or the like.

Figure 2:
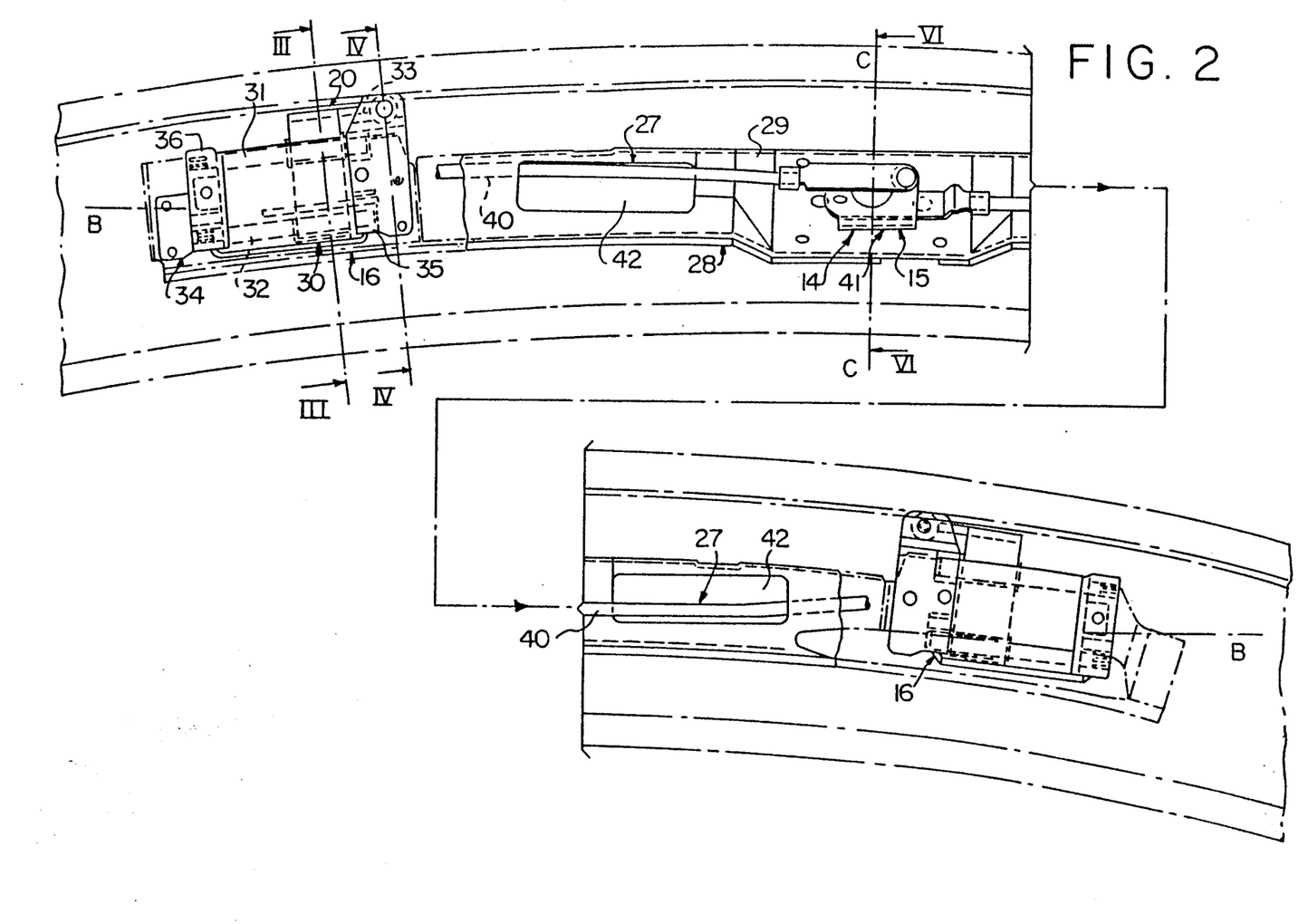
FIG. 2 is a top view of a locking arrangement for the folding top and the adjacent vehicle body.
Figure 3:
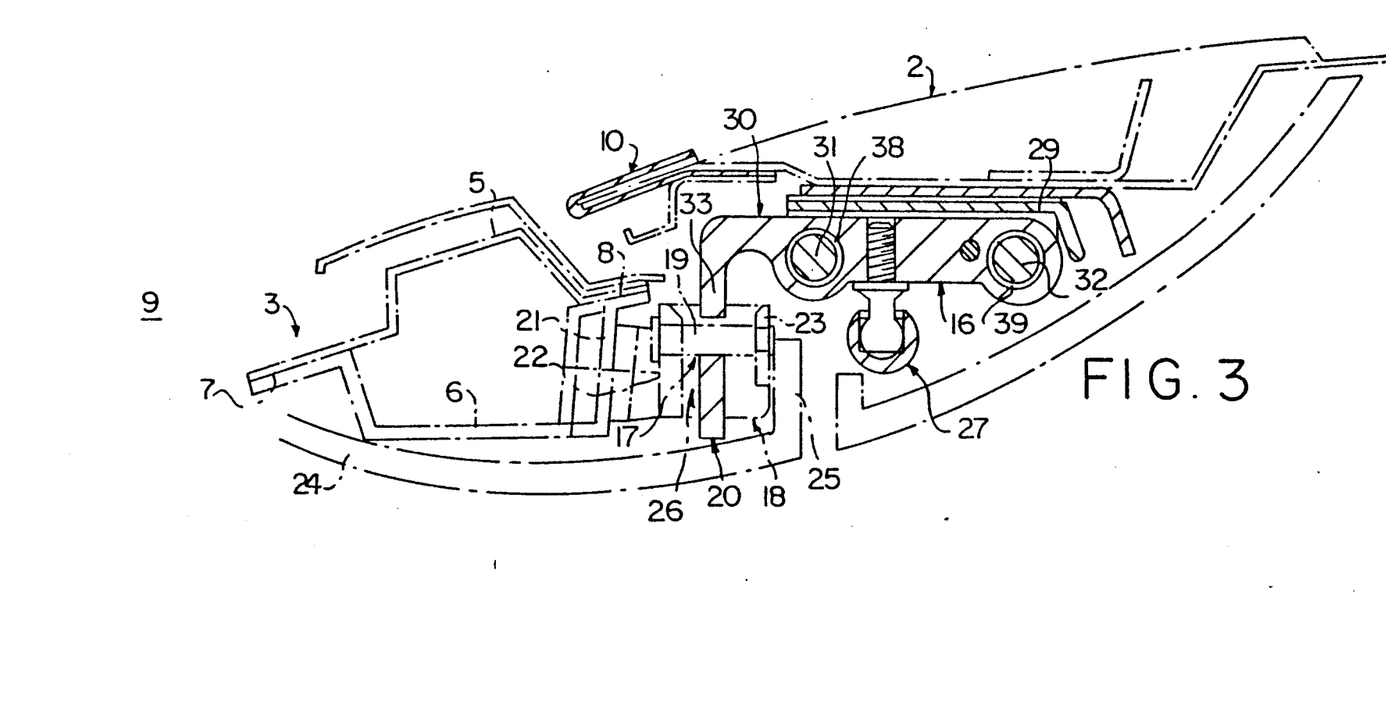
FIG. 3 is a sectional view according to Line III—III of FIG. 2.

As shown in FIGS. 2 and 3, a locking arrangement 14 is provided for fixing the folding top 2 to the windshield frame 3. The locking arrangement 14 essentially includes a central actuating device 15, two laterally exterior locking elements 16, and two receiving devices 17 arranged on the windshield frame 3.

The receiving device 17, which is accessible only from above, is formed by a closing part 18 fastened to the windshield frame 3. A bolt 19 is mounted locally on the closing part 18 and is aligned approximately horizontally. The bolt 19 extends approximately in the longitudinal direction of the vehicle and, during the opening and closing of the folding top 2, is in operative connection with a locking hook 20 of the locking element 16. The locking hook 20 is linearly displaceable in the transverse direction of the vehicle. The closing part 18 is mounted on an upright flange 21 of the profiled part 6 and has two transversely extending walls 22, 23 which are spaced when viewed in the longitudinal vehicle direction. The bolt 19 extends between the extending walls 22 and 23 as shown in FIG. 3. The bolt 19 extends through both walls 22, 23 and is fixedly connected with them as, for example, by means of riveting.

A clearance gap 26 for receiving and for linearly moving the locking hook 20 in the transverse direction of the vehicle extends between the walls 22, 23 when viewed in the transverse vehicle direction. The clearance gap 26 is open toward the top and towards the bottom as shown in FIG. 3.

The receiving device 17 on the windshield frame 3 is covered by a covering 24 from below and from the front. The front face 25 of the covering 24, facing away from the windshield 9, is pulled up approximately to the flange 8 of the windshield frame 3.

Referring to FIG. 2, the two exterior locking elements 16, the central actuating device 15 and the connecting elements 27 disposed between them are combined in a pre-assembled operable constructional unit which is assigned to a common carrier plate 29. The carrier plate 29 extends over a significant part of the width of the folding top 2 and is fastened to the front frame part 10 of the folding top 2 by means of screws or the like. However, it is also possible to fasten the components of the locking arrangement 14 individually to the front frame part 10 of the folding top 2 and eliminate the need for a carrier plate 29.

The locking hook 20 is constructed in one piece with a carriage 30 which is disposed on two tube guides 31, 32. The tube guides 31, 32 are arranged at a distance from one another in the same direction and can be displaced to a limited extent in the transverse direction B—B of the vehicle. According to FIG. 3, the locking hook 20 is formed by an approximately vertical extending, downwardly directed molded-on area 33 of the approximately horizontally aligned carriage 30. The molded-on area 33 is arranged on the side of the carriage 30 facing the receiving device 17 and projects into the clearance 26 of the receiving device 17. According to FIG. 3, the molded-on area projects slightly beyond the closing part 18 in the downward direction. The locking hook 20 extends in the transverse direction of the vehicle and has an oblong horizontally aligned slot guide 51 (FIG. 5) in which the bolt 19 is disposed when the folding to 2 is in its closed position A. As a result of the horizontal alignment of the slot guide 51, horizontal forces are not operative when the folding top 2 is locked, rather, only an upwardly directed infinitely large force.

Figures 4, 5:
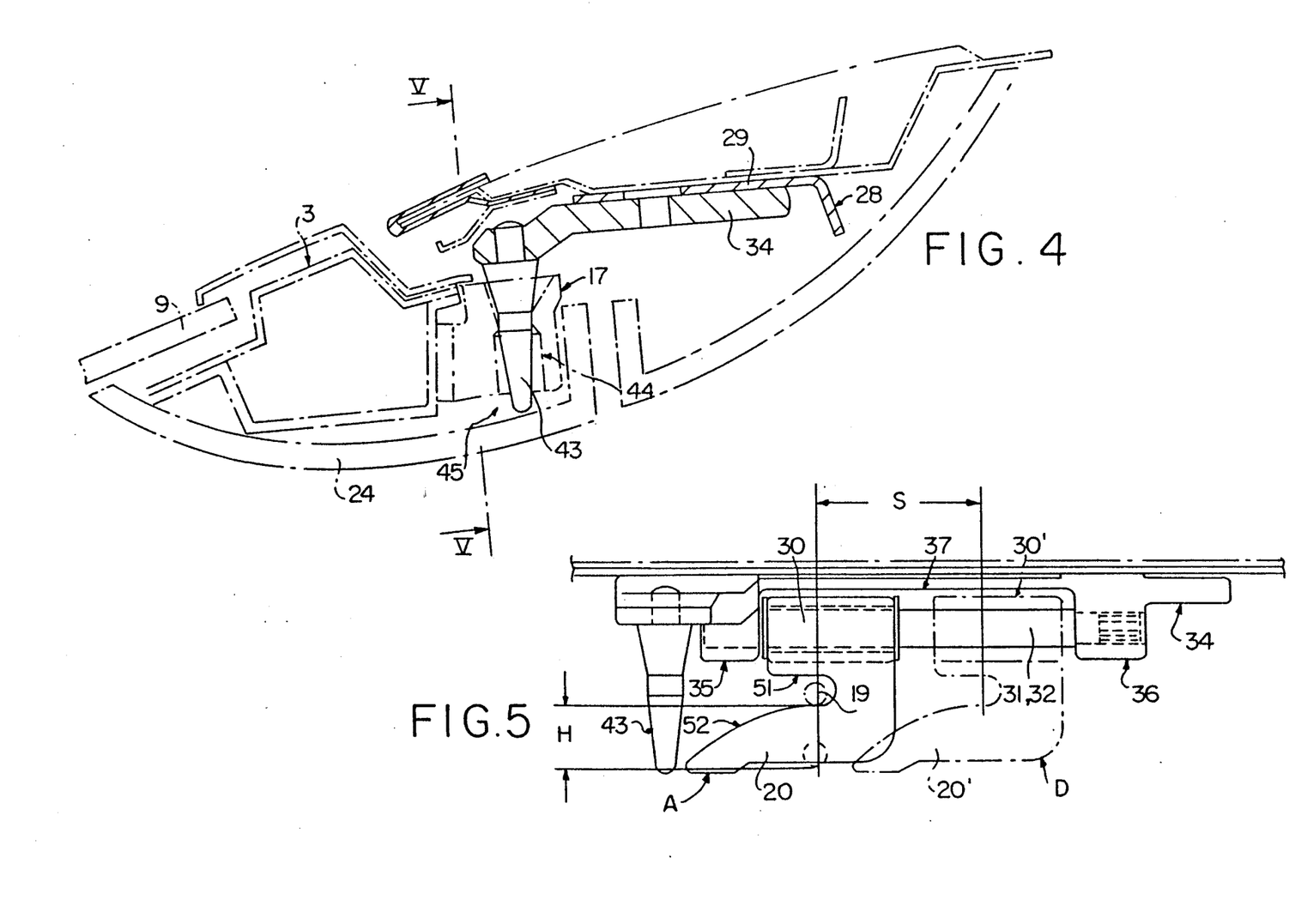
FIG. 4 is a sectional view according to Line IV—IV of FIG. 2.
FIG. 5 is a sectional view according to Line V—V of FIG. 4.

As shown in FIG. 5, in front of the slot opening 51, which is open on one side, an inclined plane 52 or a curved downward-directed path section is arranged. This path section interacts with the bolt 19 when the folding top 2 is opened and closed. By means of the inclined plane 52 or the curved path section, the folding top 2, is pulled downward by the travel H during closing of the top. The open side of the slot opening 51 faces the longitudinal center plane C—C of the vehicle.

The tube guides 31, 32 shown in FIGS. 2 and 3 are arranged on a console 34 fastened to the carrier plate 29. Corresponding to FIG. 5, the transversely extending tube guides 31, 32 located at the end sides of the vehicle are received in bearing sections 35, 36 of the console 34. The area of the tube guides 31, 32 disposed in-between extends at a distance from a bottom section 37 of the console 34. The carriage 30 is disposed on the tube guides 31, 32 by means of bearing bushes 38, 39. In addition, each carriage 30 is connected with the actuating device 15 by means of the connecting element 27. The connecting element 27 is formed by a connecting rod 40 which, on one side, is connected to the carriage 30 and, on the other side, to a turnstile 41 of the actuating device 15. The connecting rod 40 is guided locally through a rectangular recess 42 of the carrier plate 29. The connection between the connecting rod 40 and the carriage 30, as shown in FIG. 3, uses a spherical-head connection. However, it is also possible to connect the connecting rod 40 to the carriage 30 by means of another flexible connection.

In the closed position A of the vehicle top, the carriage 30 including the locking hook 20 is disposed adjacent to the interior bearing section 35 of the console 34, whereas, in the unlocked position D of the locking arrangement 14, the carriage 30 extends adjacent to the other outer bearing section 36 (position 30' as shown in FIG. 5). As shown in FIG. 4, a downward-projecting centering pin 43 is also arranged on the console 34 and, with a corresponding opening 44 of the receiving device 17, forms a centering device 45 for the folding top 2. Conically constructed end sections of the centering pin 43 and of the opening 44 facilitate the insertion of the centering pin 43, whereas, in the locking position, the centering pin 43 is disposed in the opening 44 without any play. In the locking position, a cylindrical collar of the centering pin 43 form-fittingly interacts with a correspondingly cylindrical section of the opening 44.

During the locking of the folding top 2, the carriage 30 with the locking hook 20 moves from the outside toward the inside along path S as shown in FIG. 5.

Figures 8, 9:
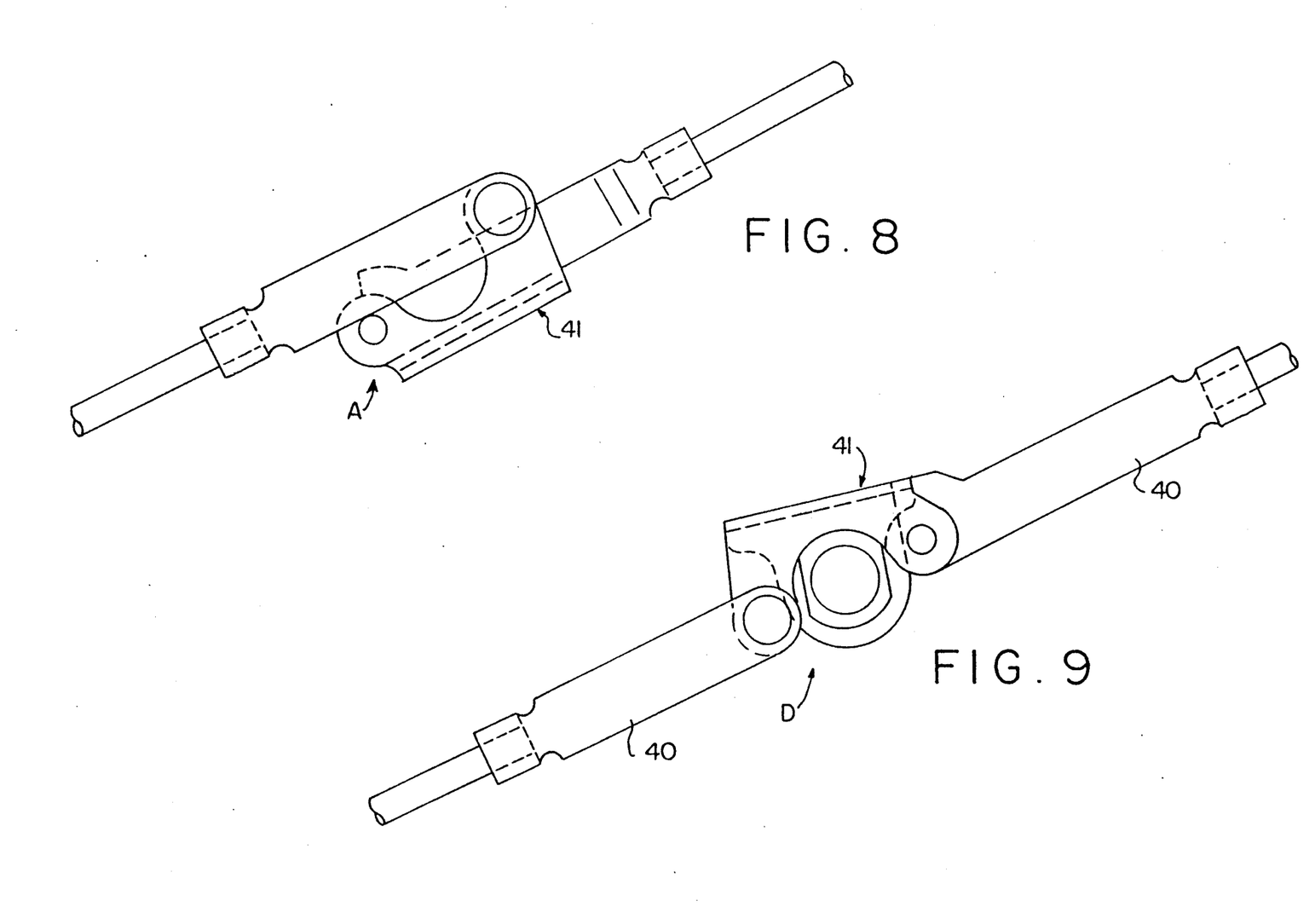
FIG. 8 is a view in the direction of the arrow R of FIG. 7 in the locked position.
FIG. 9 is a view in the direction of the arrow R of FIG. 7 in the unlocked position.
Figure 10:
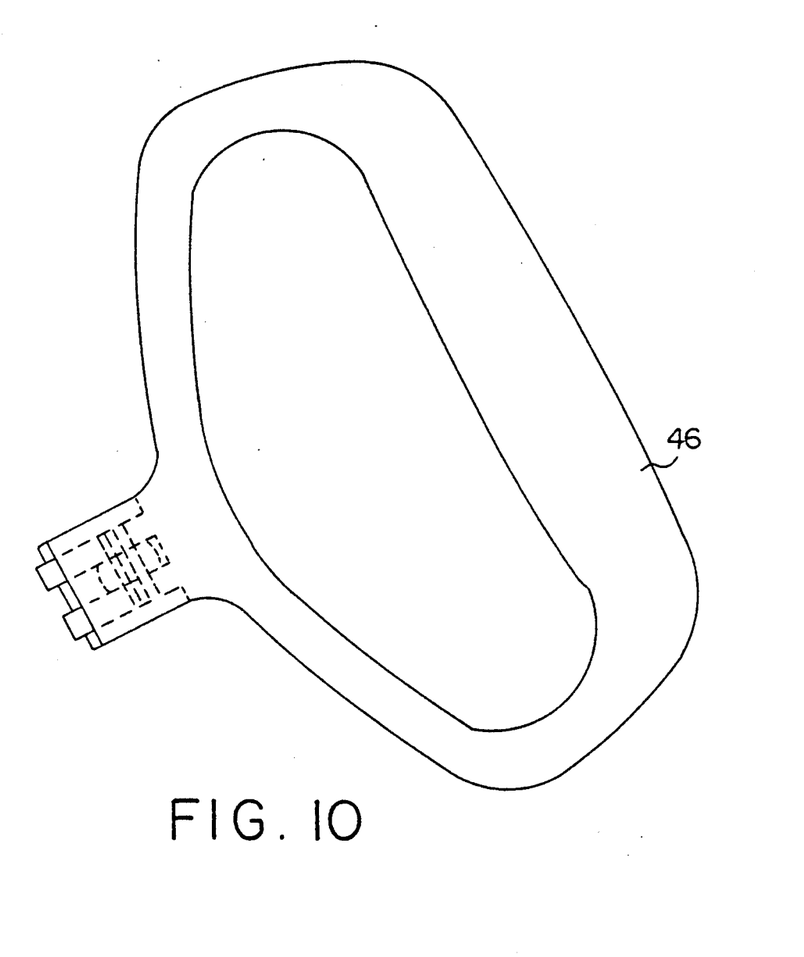
FIG. 10 is a view in the direction of arrow S of FIG. 6.

According to a first embodiment of FIG. 6, the actuating device 15 includes a rotatable and pivotable handle 46 which, by way of a bearing 47, is connected with the turnstile 41. The folding top 2 is pulled downward with one hand by means of the bow-shaped handle 46. The folding top 2 is then locked and subsequently the handle 46 is swivelled upward into a sunk inoperative position, thus achieving a good and simple locking operation. In the unlocked position D, as shown in FIG. 9, the connecting rods 40 take up a prolate position. The locked position A of the connecting rods 40 or of the turnstile 41 is illustrated in FIG. 8. When the folding top 2 is locked, a threefold securing exists against a releasing of the locking arrangement 14. As a result of the horizontal alignment of the oblong slot opening 51 shown in FIG. 5, no horizontal forces occur; i.e., all components of the locking arrangement 14 are without any tension in the locked condition. In addition, the handle 46 has an over-dead-center position when in its locked position. This avoids a release of the locking arrangement 14. Also, the bow-shaped handle 46 cannot be turned in the folded-up inoperative position.

Figure 11:
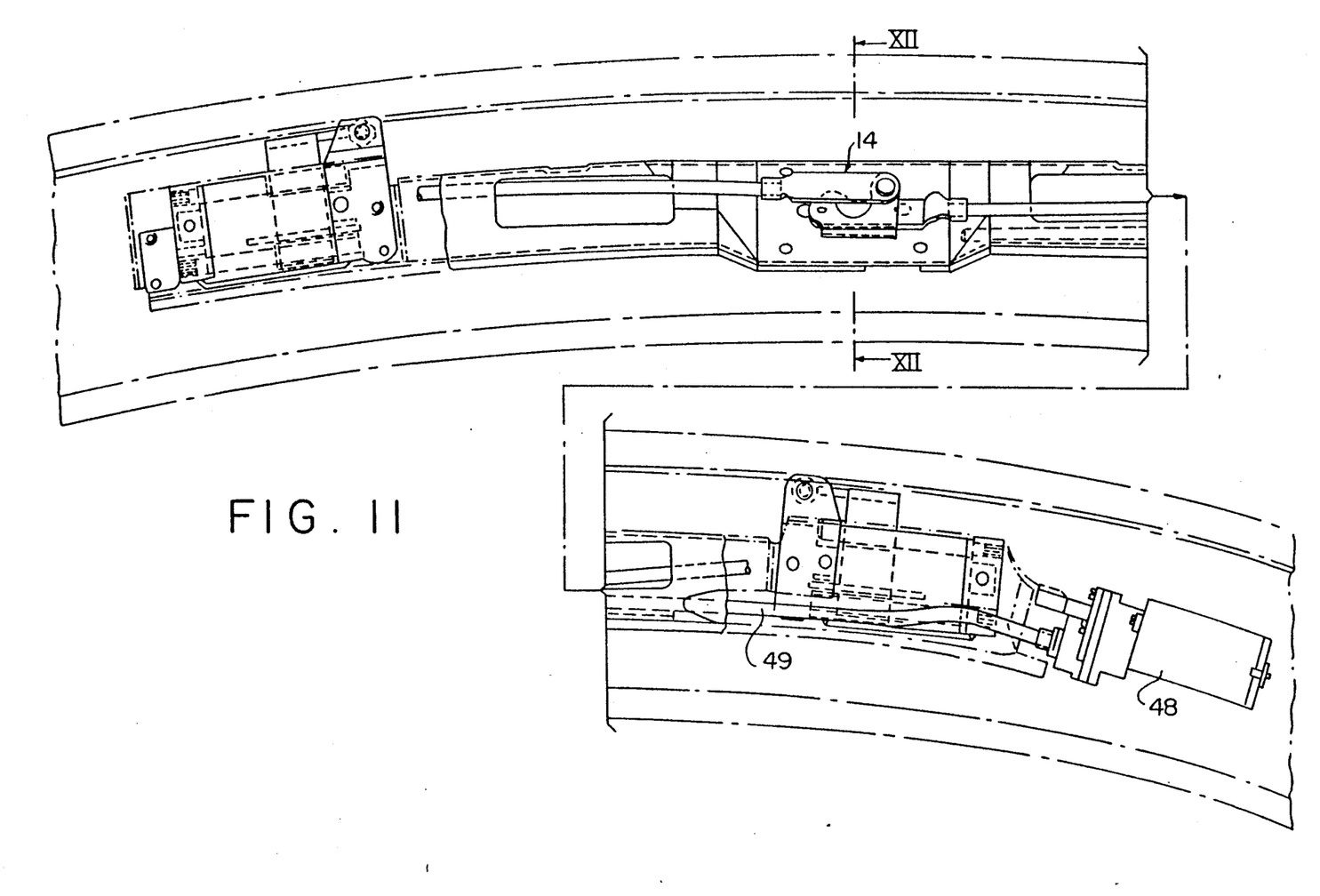
FIG. 11 is a view corresponding to FIG. 2 of another embodiment of the locking arrangement.
Figure 12:
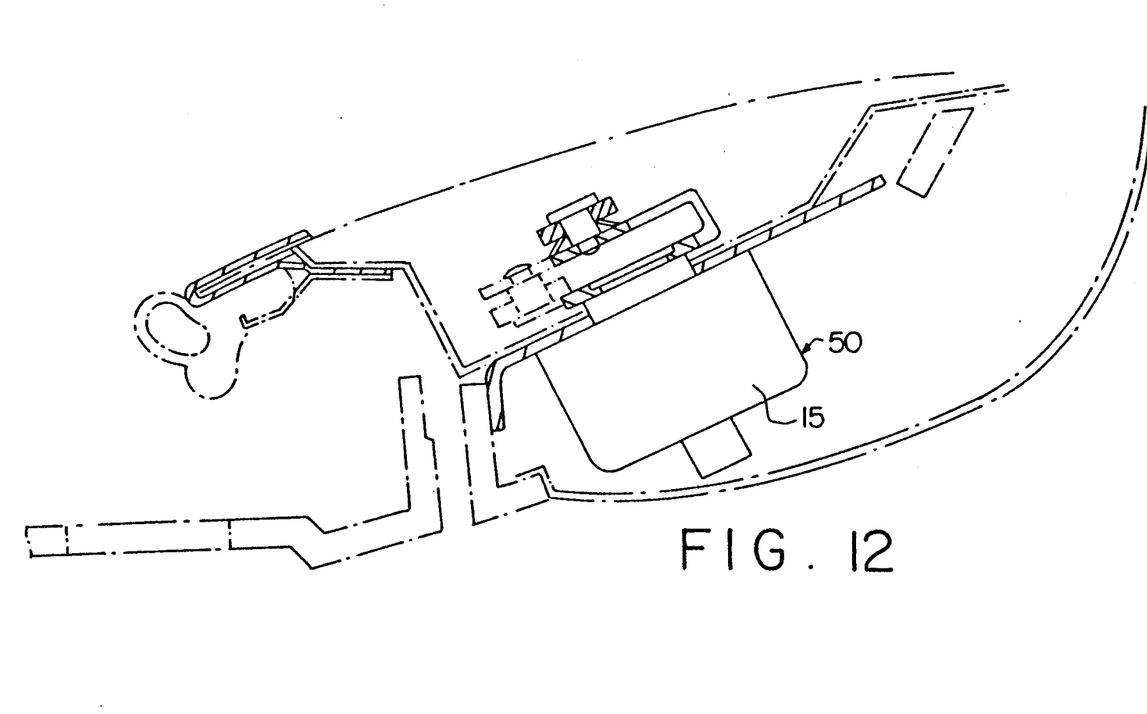
FIG. 12 is a sectional view according to Line XII—XII of FIG. 11.

In a second embodiment, the locking arrangement 14 is operated by a motor as shown in FIGS. 11 and 12. For this purpose, an electric motor 48 with a transmission is provided on the front frame part 10, specifically in a laterally exterior area. The electric motor 48, by way of a flexible shaft 49, interacts with a worm gear 50 of the centrally arranged actuating device 15.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An arrangement for locking a top having a front frame part on a windshield frame of a motor vehicle, comprising:
   a central actuating device operatively arranged on the front frame part of said top in the approximate area of a longitudinal center plane of the motor vehicle;
   receiving devices mounted on the windshield frame;
   laterally exterior locking elements interacting with said receiving devices when said top is in a closed position, said central actuating device operatively connected to said laterally exterior locking elements via transversely extending connecting elements;
   wherein said receiving devices are only accessible from above and include a closing part fastened to the windshield frame, a bolt aligned approximately horizontally and extending in an approximate longitudinal direction of the motor vehicle, said bolt being mounted locally on said closing part; and
   wherein said laterally exterior locking elements include a locking hook which projects into said closing part and is displaceably guided in a transverse direction of the motor vehicle, said bolt being in an operative connection with said locking hook when the top is closed.

2. An arrangement according to claim 1, wherein said bolt is disposed on two spaced transversely extending walls of said closing part.

3. An arrangement according to claim 2, further comprising a clearance gap allowing the introducing and moving of the locking hook between said two spaced walls, viewed in a transverse vehicle direction.

4. An arrangement according to claim 1, further comprising a covering for the windshield frame extending along a bottom side and an upright front side of the windshield frame.

5. An arrangement according to Claim 1, wherein said laterally exterior locking elements, said central actuating device and said connecting elements form a pre-assembled operable constructional unit arranged on a common carrier plate.

6. An arrangement according to claim 1, wherein said locking hook is arranged in one piece with a carriage.

7. An arrangement according to claim 6, wherein said carriage is approximately horizontally aligned, and wherein said locking hook includes a vertically extending molded-on area of said approximately horizontally aligned carriage, said molded-on area being arranged on the side of said carriage facing said receiving device.

8. An arrangement according to claim 6, wherein the carriage is disposed on two tube guides arranged at a distance from one another and directed in the same direction, said carriage being displaceable to a limited extent in the transverse vehicle direction.

9. An arrangement according to claim 8, further comprising a console of the locking element fastened to said carrier plate, wherein said two tube guides are mounted on said console.

10. An arrangement according to claim 6, wherein said carriage is connected with said central actuating device by way of a connecting element formed by a connecting rod.

11. An arrangement according to claim 1, wherein said locking hook has a horizontally aligned oblong slot opening which is open on one side, a downward-directed section being disposed in front of the slot opening, wherein said bolt, when the top is in a closed position, extends inside the horizontally aligned oblong slot opening and rests against said locking hook.

12. An arrangement according to claim 11, wherein said open side of said oblong slot opening faces a longitudinal center plane of the motor vehicle.

13. An arrangement according to claim 1, further comprising a centering device, in addition to the arrangement, which is provided for the top, said centering device being formed by a downward-projecting centering pin mounted on a console which engages in a corresponding opening of said receiving device.

14. An arrangement according to claim 10, wherein said connecting rods are rotatably connected with a turnstile of the central actuating device, said turnstile being arranged inside the front frame part on a side of the central actuating device facing away from a handle.

15. An arrangement according to claim 1, wherein during locking of the top, said locking hooks move from the outside toward the inside along a path and extend around said bolt.

* * * * *